United States Patent
Weigell et al.

(10) Patent No.: US 11,171,558 B2
(45) Date of Patent: Nov. 9, 2021

(54) DC POWER SUPPLY WITH ADAPTIVE CONTROLLED PREREGULATOR AND POSTREGULATOR

(71) Applicant: Rohde & Schwarz GmbH & Co. KG, Munich (DE)

(72) Inventors: Philipp Weigell, Baierbrunn (DE); Sascha Kunisch, Haibach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 34 days.

(21) Appl. No.: 16/723,080

(22) Filed: Dec. 20, 2019

(65) Prior Publication Data

US 2021/0194349 A1    Jun. 24, 2021

(51) Int. Cl.
| | |
|---|---|
| *H02M 1/14* | (2006.01) |
| *H02M 3/04* | (2006.01) |
| *H02M 1/00* | (2006.01) |

(52) U.S. Cl.
CPC ............. *H02M 1/14* (2013.01); *H02M 3/04* (2013.01); *H02M 1/007* (2021.05); *H02M 1/0025* (2021.05); *H02M 1/0045* (2021.05)

(58) Field of Classification Search
CPC .... H02M 1/14; H02M 3/04; H02M 2001/025; H02M 2001/0045; H02M 2001/007
See application file for complete search history.

(56) References Cited

U.S. PATENT DOCUMENTS

| | | | |
|---|---|---|---|
| 3,538,418 A | 11/1970 | Allington | |
| 3,737,758 A * | 6/1973 | Allington | G05F 1/563 363/86 |
| 6,262,565 B1 * | 7/2001 | Williams | H02M 5/257 323/237 |
| 2012/0206064 A1 * | 8/2012 | Archenhold | H05B 45/395 315/297 |
| 2021/0173420 A1 * | 6/2021 | Weigell | G01R 31/2839 |
| 2021/0175739 A1 * | 6/2021 | Weigell | H02J 9/005 |

* cited by examiner

*Primary Examiner* — Adolf D Berhane
(74) *Attorney, Agent, or Firm* — Ditthavong, Steiner & Mlotkowski

(57) ABSTRACT

A DC power supply and a method for operating a DC power supply, wherein the DC power supply comprises at least one feedback-controlled preregulator, at least one feedback-controlled postregulator supplied by the feedback-controlled preregulator, output terminals for supplying regulated constant current or regulated constant voltage to a load, and a control unit for controlling at least one of the feedback-controlled preregulator and the feedback-controlled postregulator, and designed for adjusting a voltage offset or a current offset added to a signal in a feedback loop of at least one of the feedback-controlled preregulator and the feedback-controlled postregulator.

16 Claims, 5 Drawing Sheets

DC POWER SUPPLY WITH ADAPTIVE CONTROLLED PREREGULATOR AND POSTREGULATOR

Figure 1:
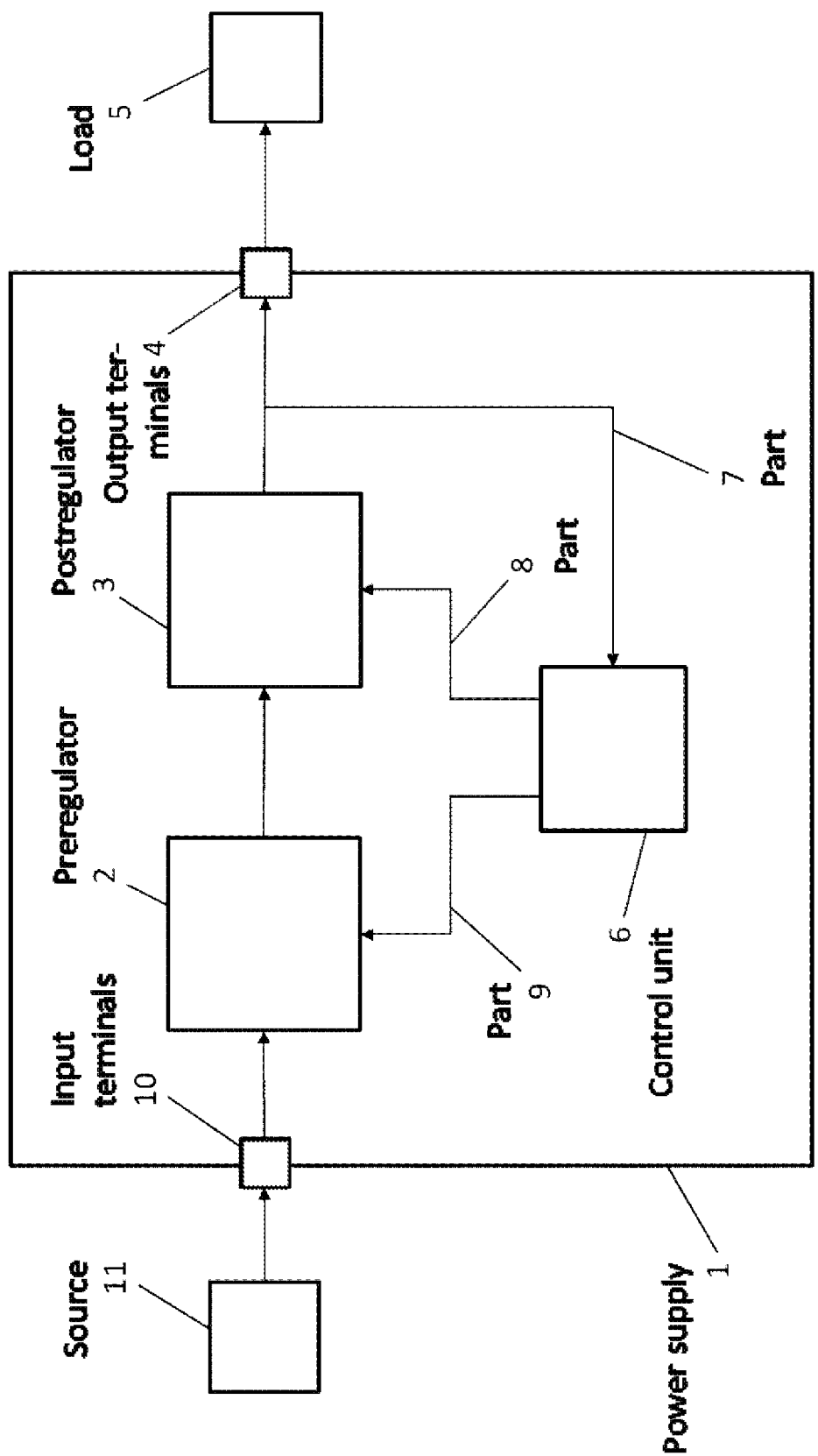

The present invention relates to a direct current (DC) power supply and a method for operating a DC power supply, wherein the DC power supply comprises at least one feedback-controlled preregulator, at least one feedback-controlled postregulator supplied by the feedback-controlled preregulator, output terminals for supplying regulated constant current or regulated constant voltage to a load, and a control unit for controlling at least one of the feedback-controlled preregulator and the feedback-controlled postregulator.

A power supply or a power supply unit is a device or assembly for supplying power to devices or assemblies, like an electrical or electronic load, that requires different voltages and currents than those provided by a source, like mains supply or batteries. Some power supplies are separate, standalone pieces of equipment, while others are built into the load appliances that they power. Power supplies are also referred to as electric power converters, since the main function of a power supply is to convert electric current from the source to the correct voltage, current and/or frequency to power the connected electric load.

Power supplies are categorized in various ways. One type of a power supply is a DC power supply, wherein the most common one is a switched-mode power supply (SMPS). The SMPS is powered from a DC source or from an AC source and supplies constant DC voltage to its load. In a SMPS the AC mains input is directly rectified and then filtered to obtain a DC voltage. The resulting DC voltage is then switched on and off at a higher frequency by electronic switching, thus producing an AC current that will pass through a high frequency transformer or inductor. After the inductor or transformer secondary, the high frequency AC is rectified and filtered to produce the DC output voltage.

When using such DC power supplies, it necessary to have for each different application/load another DC power supply, wherein each DC power supply has a different balancing/relation between adjusted control response/behavior, ripple & noise specification and degree of efficiency that is configured for the desired load connected to the DC power supply.

The ripple & noise specification describes a superimposed residual ripple and noise voltage on a DC voltage, respectively is an unwanted AC voltage superimposed on the output terminals of power supplies. Ripple & noise are produced as a result of power supply operation and referred to as differential or symmetrical noise.

To provide a power supply which can be used for more different loads, the U.S. Pat. No. 3,538,418 discloses a regulated power supply having a switching-mode preregulator connected between a rectifier and a source of alternating current voltage, the output voltage of said rectifier being applied to the output terminals of the power supply through a post regulator stage which functions as a dynamic low-pass filter. A direct current amplifier, coupled to the output circuitry, provides negative voltage feedback simultaneously to the preregulator and the postregulator stage. Further, manually-operable switch means are provided in this document to condition the power supply for operation either at a constant voltage output or a constant current output, and the magnitude of the voltage across the output terminals of the power supply can be varied from zero to maximum by adjusting the magnitude of an offset potential applied to the input of the amplifier.

By the regulated power supply of the U.S. Pat. No. 3,538,418, it is therefore possible to manually adjust an offset. Thus, the power supply of this document can be used for more different loads. This can be done by the potentiometer 32 of this document.

The problem that arises in this document is that the area/range in which the power supply can be used is limited/restricted by the setting range of the potentiometer 32. Thus, even though the power supply of the U.S. Pat. No. 3,538,418 can be used for different loads, it is still limited to the setting range of the potentiometer 32, which is hardwired in the power supply and therefore cannot be easily exchanged.

It is therefore an object of the present invention to provide a DC power supply that can be used for a great variety of different loads/applications, wherein the power supply allows an application/load-related balancing between higher efficiency versus lower ripple & noise versus control response/behavior.

This object is achieved by means of the features of the independent claims. The dependent claims further develop the central idea of the present invention.

The present invention relates to a DC power supply comprising at least one feedback-controlled preregulator, at least one feedback-controlled postregulator supplied by the feedback-controlled preregulator, output terminals for supplying a regulated constant current or regulated constant voltage to a load, and a control unit controlling at least one of the feedback-controlled preregulator and the feedback-controlled postregulator, and designed for adjusting a voltage offset or a current offset added to a signal in a feedback loop of at least one of the feedback-controlled preregulator and the feedback-controlled postregulator.

By the control unit, the adjusting of the voltage offset or the current offset is completely flexible, which makes it possible to significantly expand the range of loads/applications that can be used with the power supply.

Advantageously, the control unit is a microcontroller, a processor or a FPGA, the feedback-controlled preregulator is at least one of a switching mode regulator and a phase angle controlled regulator, and the feedback-controlled postregulator is at least one of a switching mode regulator and a linear regulator.

The voltage offset can be a voltage offset at an input of an amplifier or comparator of the DC power supply.

In a preferred embodiment, the DC power supply comprises a user interface for inputting data as to the voltage offset or the current offset.

Advantageously, the voltage offset or the current offset is calculated by the control unit, preferably on the basis of at least one sensed feedback signal, wherein the sensed feedback signal can be a temperature signal of a temperature sensor of the DC power supply. Alternatively or additionally, the sensed feedback signal can represent a characteristic sensed at the output terminals, wherein the sensed feedback signal can represent the voltage or the current at the output terminals.

Further, it is possible that the sensed feedback signal is processed by the control unit in order to detect oscillations in a feedback loop of the feedback-controlled preregulator or the feedback-controlled postregulator. Alternatively or additionally, the sensed feedback signal can be processed by the control unit in order to detect the frequency of the current or the voltage at the output terminals.

In a preferred embodiment, a value for the voltage offset or the current offset, to be implemented by the control unit, is obtained from an internal memory of the DC power supply, or from an interface of the DC power supply, which can be connected to an external storage device. The values stored in the internal memory or the external storage device can be obtained by machine learning.

Advantageously, the control unit can be designed to adjust the voltage offset or the current offset during an ongoing operation of the DC power supply.

Further, it is possible that the voltage offset or the current offset is selected to affect the ripple & noise at the output terminals.

The present invention further relates to a method for operating a DC power supply comprising controlling at least one feedback-controlled preregulator of the DC power supply, controlling at least one feedback-controlled postregulator of the DC power supply supplied by the feedback-controlled preregulator, adjusting a voltage offset or a current offset and adding the adjusted voltage offset or the adjusted current offset to a signal in a feedback loop of at least one of the feedback-controlled preregulator and the feedback-controlled postregulator, and supplying a regulated constant current or regulated constant voltage to output terminals of the DC power supply for a load connected to the output terminals.

By the DC power supply and the method for operating a DC power supply of the present invention, it is now possible that an even greater variety of different loads can be connected to the power supply, since the control unit of the DC power supply controls at least one of the feedback-controlled preregulator and the feedback-controlled postregulator and is designed for adjusting a voltage offset or a current offset added to a signal in a feedback loop of at least one of the feedback-controlled preregulator and the feedback-controlled postregulator.

Therefore, it is possible that a load-related balancing between higher efficiency versus lower ripple & noise versus control behavior is possible and thus, it is not necessary to use different power supplies with different balancing of adjusted control behavior, ripple & noise specification and degree of efficiency.

Figure 2:
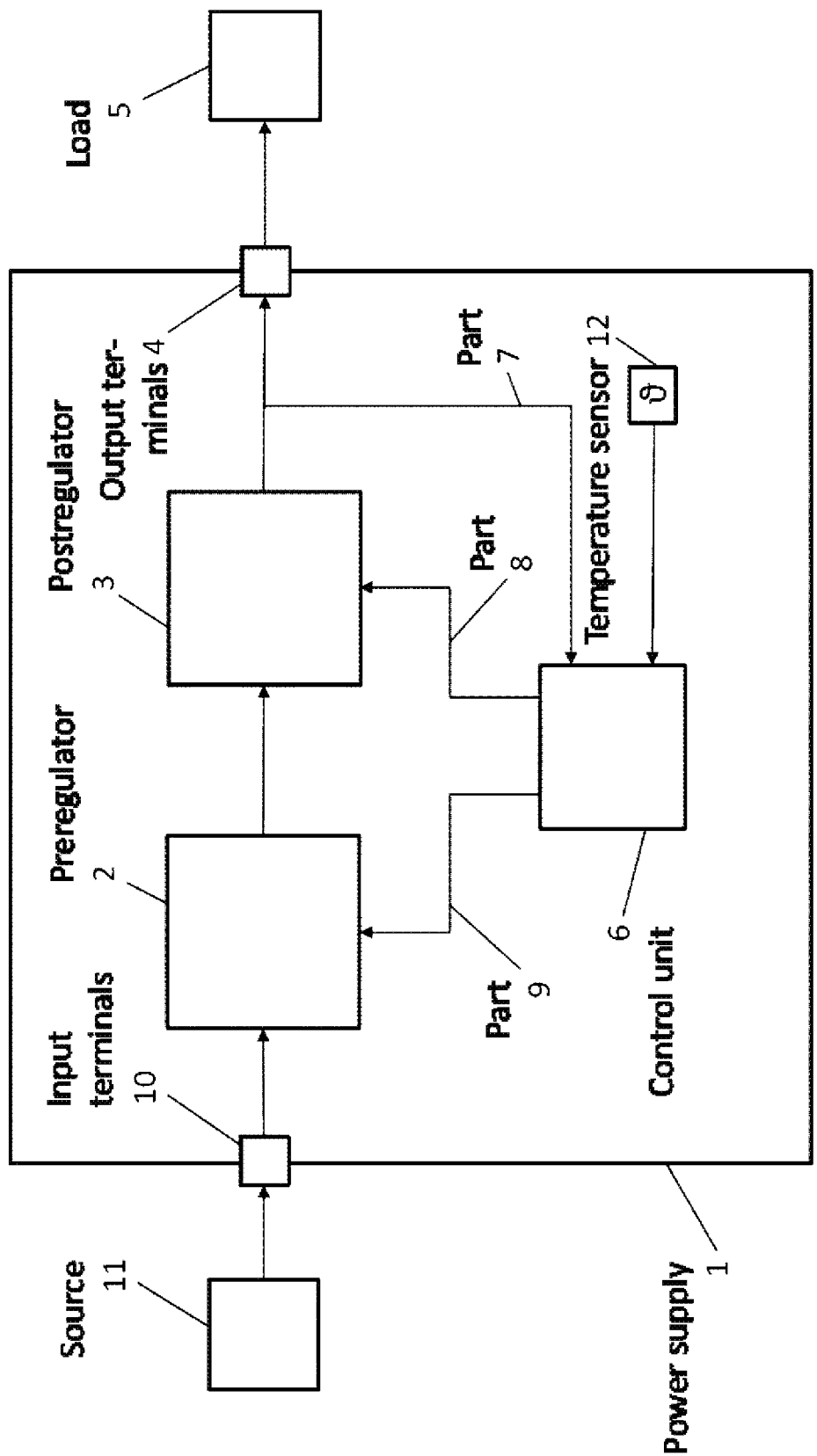
Figure 3:
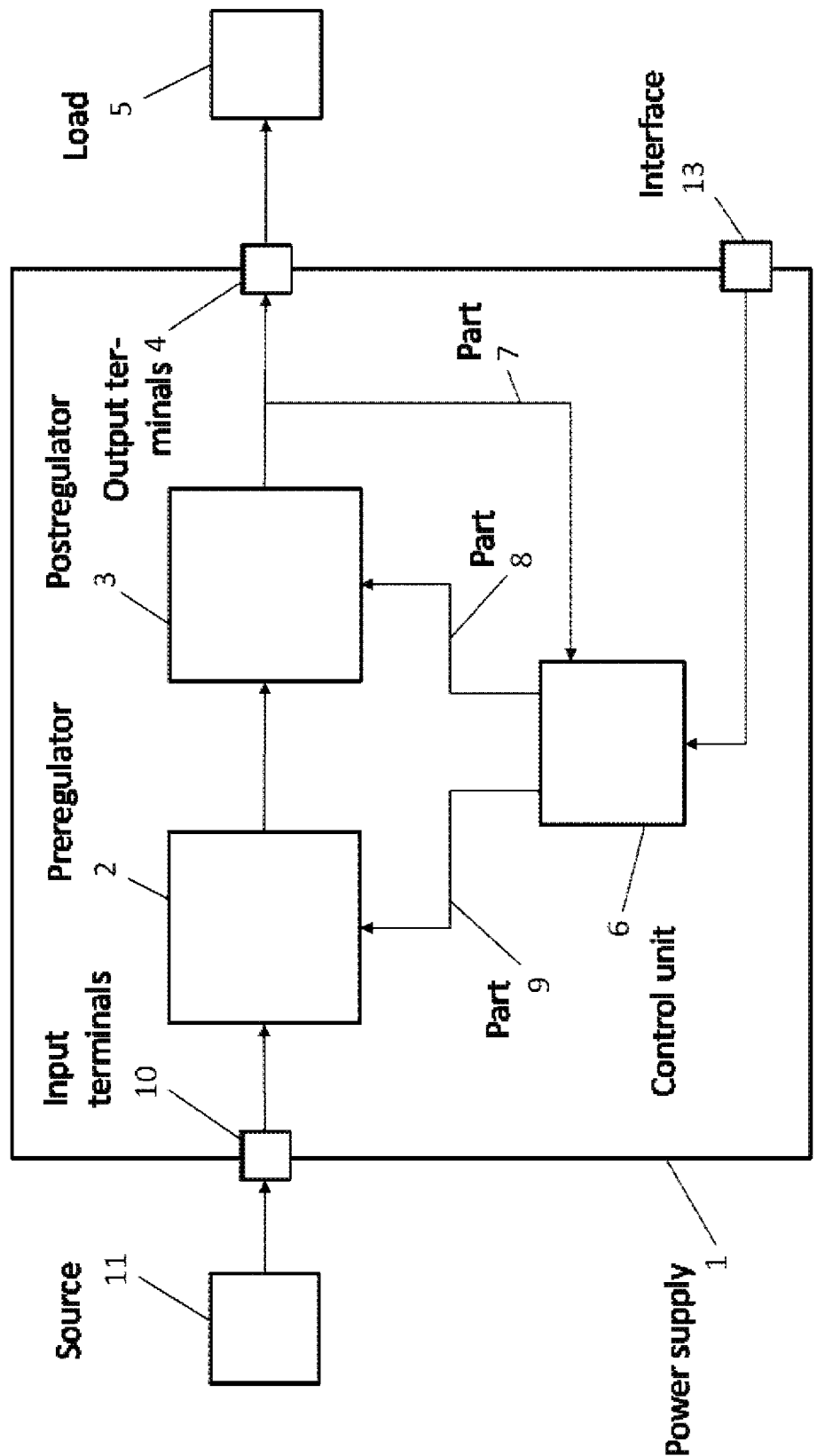
Figure 4:
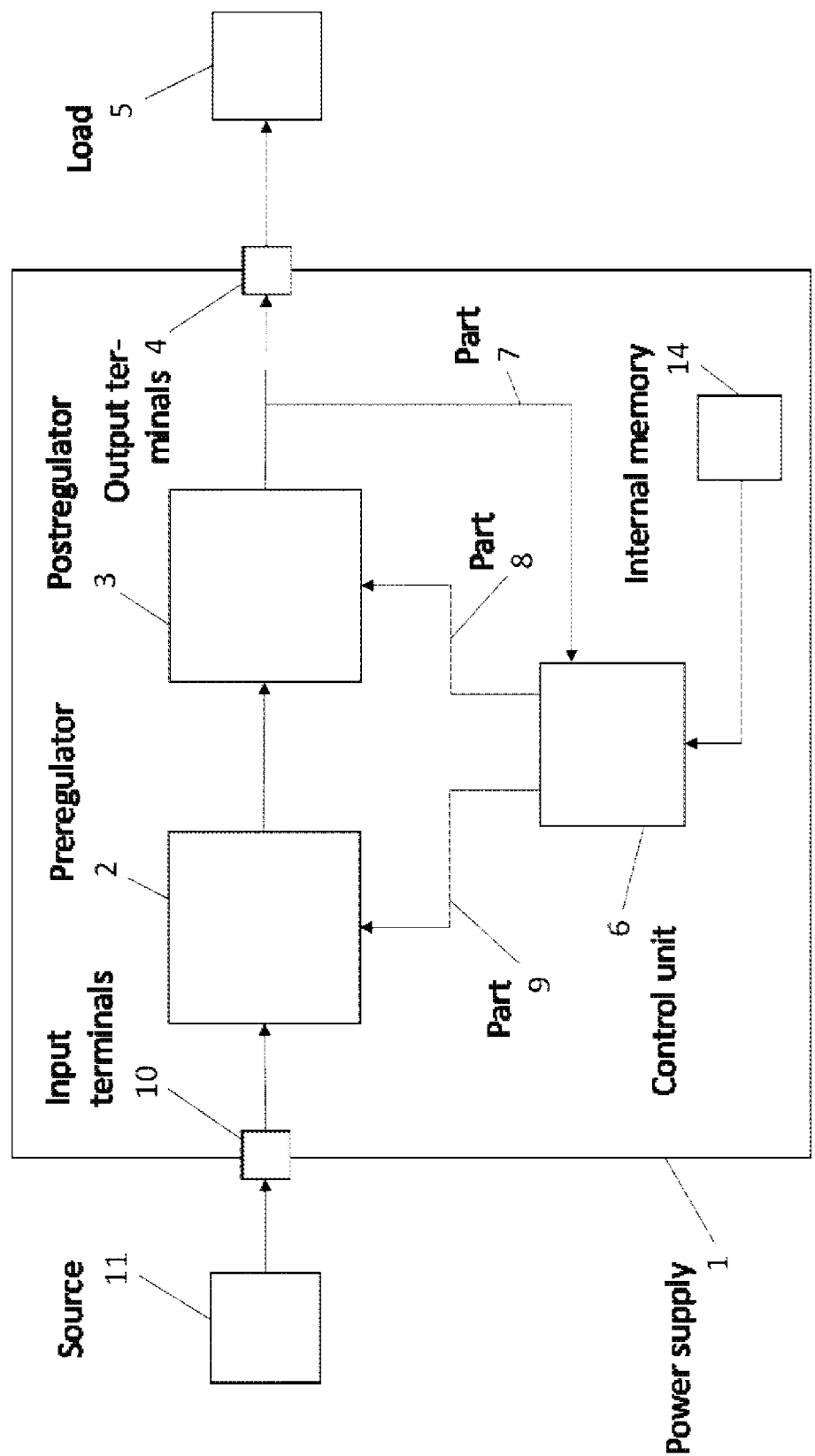
Figure 5:
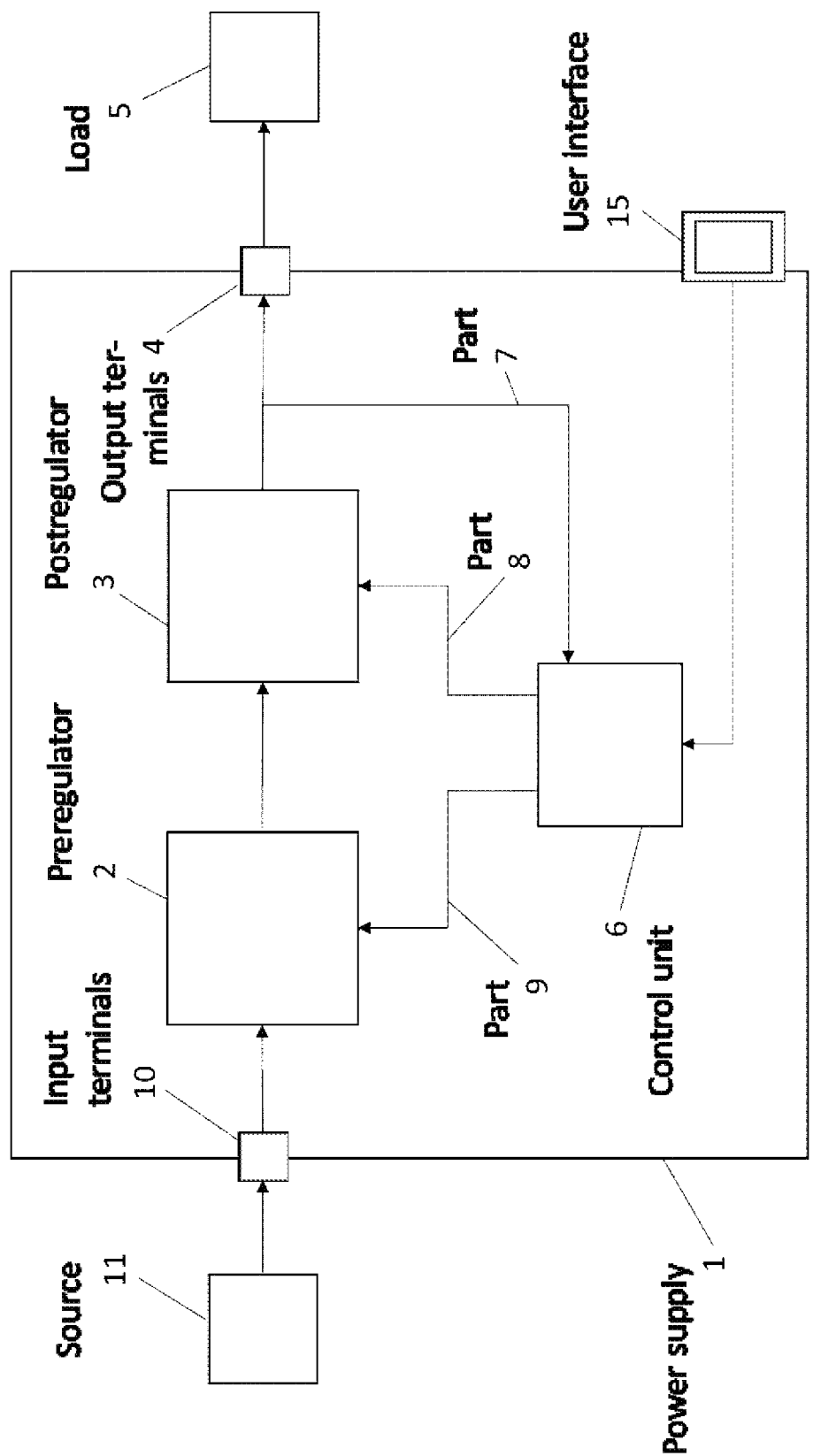

These and other aspects and advantages of the present invention will become more apparent when studying the following detailed description, in connection with the figures in which:

FIG. 1 shows schematically a DC power supply;
FIG. 2 shows schematically another DC power supply;
FIG. 3 shows schematically another DC power supply;
FIG. 4 shows schematically another DC power supply;
FIG. 5 shows schematically another DC power supply.

As already described above, a DC power supply has only a limited range in which it can be used. Thus, for different loads, different power supplies have to be used, which have a different balancing of adjusted control behavior, ripple & noise specification and degree of efficiency. The U.S. Pat. No. 3,538,418 shows already a regulated power supply, in which the magnitude of the voltage across the output terminals of the power supply can be varied from zero to maximum by adjusting the magnitude of an offset potential applied to the input of the amplifier.

The problem that arises in this document is that the range in which the power supply can be used is limited by the setting range of the potentiometer 32. Thus, even though the power supply of the U.S. Pat. No. 3,538,418 can be used for different loads, it is still limited to the setting range of the potentiometer 32, which is hardwired in the power supply and therefore cannot be easily exchanged.

In the present invention, a DC power supply is now provided that comprises at least one feedback-controlled preregulator, at least one feedback-controlled postregulator supplied by the feedback-controlled preregulator, output terminals for supplying a regulated constant current or a regulated constant voltage to a load and a control unit controlling at least one of the feedback-controlled preregulator and the feedback-controlled postregulator, and designed for adjusting a voltage offset or a current offset added to a signal in a feedback loop of at least one of the feedback-controlled preregulator and the feedback-controlled postregulator.

Such a DC power supply is shown in FIG. 1, wherein the DC power supply 1 discloses a feedback-controlled preregulator 2, a feedback-controlled postregulator 3 supplied by the feedback-controlled preregulator 2, output terminals 4 for supplying a regulated constant current or a regulated constant voltage to a load 5, and a control unit 6 controlling at least one of the feedback-controlled preregulator 2 and the feedback-controlled postregulator 3 and designed for adjusting a voltage offset or a current offset added to a signal in a feedback loop 7, 8, 9 of the feedback-controlled preregulator 2 and/or the feedback-controlled postregulator 3.

In more detail, the feedback-controlled preregulator 2 is connected to input terminals 10 of the DC power supply 1, wherein the input terminals 10 are then connected to a source 11, like an AC mains supply or batteries. The feedback-controlled preregulator 2 and the feedback-controlled postregulator 3 then convert an electric current from the source 11 connected to the input terminal 7 to the correct regulated constant current or the correct regulated constant voltage to power the load 5 connected to the output terminals 4. Thus, the feedback-controlled preregulator 2 is connected to the input terminals 10, the feedback-controlled preregulator 2 is further connected to the feedback-controlled postregulator 3 and the feedback-controlled postregulator 3 is connected to the output terminals 4.

In the DC power supply 1 shown in FIG. 1 the control unit 6 is connected to the connection between the feedback-controlled postregulator 3 and the output terminals 4 via one part 7 of the feedback loop, wherein this part 7 of the feedback loop is used for the feedback-controlled postregulator 3 as well as for the feedback controlled preregulator 2. The control unit 6 is then further connected to the feedback-controlled preregulator 2 via a further part 9 of the feedback loop and connected to the feedback-controlled postregulator 3 via a further part 8 of the feedback loop.

Thus, the feedback loop of the feedback-controlled postregulator 3 comprises the part 7 and the part 8 and the feedback loop of the feedback-controlled preregulator 2 comprises the part 7 and the part 9.

By the control unit 6 it is now possible to flexibly adjust a voltage offset or a current offset added to the signal in the feedback loop 7, 8, 9 of the feedback-controlled preregulator 2 and/or the feedback-controlled postregulator 3.

Therefore, it is possible that a free and flexible load-related balancing between higher efficiency versus lower ripple & noise versus control behavior without any restrictions is applicable, and thus, the power supply 1 can be used for a great variety of different loads 5. The range in which the power supply 1 can be used is therefore not restricted/limited by any setting range of a potentiometer or the like.

The control unit 6, which can be for example a microcontroller, a processor or a Field Programmable Gate Array (FPGA), allows the adjusting of the voltage offset or the current offset completely flexible and thus, there is no limitation to any components used for the adjusting.

Regarding the feedback-controlled preregulator 2 and the feedback-controlled postregulator 3, it should be noted that the feedback-controlled preregulator 2 can be a switching mode regulator and/or a phase angle controlled regulator and the feedback-controlled postregulator 3 can be a switching mode regulator and/or a linear regulator.

The voltage offset can be a voltage offset at an input of an amplifier or a comparator of the power supply 1.

Regarding the voltage offset and/or the current offset, it should be noted that the control unit 6 can calculate the offset, wherein the calculation is for example based on a sensed feedback signal.

The sensed feedback signal can for example represent a characteristic sensed at the output terminals 4, wherein the sensed feedback signal can represent the voltage or the current at the output terminals 4.

In addition, it is possible that the sensed feedback signal is processed by the control unit 6 in order to detect oscillations in the feedback loop of the feedback-controlled preregulator 2 or the feedback-controlled postregulator 3. It would be also possible, alternatively or additionally, that the sensed feedback signal is processed by the control unit in order to detect the frequency of the current or the voltage at the output terminals 4.

In FIG. 2 an example for a sensed feedback signal is shown in more detail, wherein FIG. 2 discloses a DC power supply 1 that comprises the same or similar components as the DC power supply 1 in FIG. 1. In addition, a temperature sensor 12 is connected to the control unit 6 and the sensed feedback signal is a temperature signal of the temperature sensor 12 that measures the temperature of the DC power supply 1.

Further, it is possible that a value for the voltage offset or the current offset, to be implemented by the control unit 6, is obtained from an external or an internal storage. In FIG. 3 an example for an external storage is shown in more detail, wherein FIG. 3 discloses a DC power supply 1 that comprises the same or similar components as the DC power supply 1 in FIG. 1. In addition, the DC power supply 1 shown in FIG. 3 comprises an interface 13 that can be connected to an external storage device, wherein a value for the voltage offset or the current offset, to be implemented by the control unit 6, is obtained from this external storage device. This external storage device can be for example a database or any other kind of storage connected to the interface 13 via a network connection.

FIG. 4 shows an example for DC power supply 1 with an internal storage, wherein again the DC power supply 1 of FIG. 4 comprises the same or similar components as the DC power supply 1 in FIG. 1. Additionally, in difference to FIG. 3, the DC power supply 1 in FIG. 4 comprises an internal memory 14 that is connected to the control unit 6, wherein the value for the voltage offset or the current offset, to be implemented by the control unit 6, is obtained not from an external storage device as in FIG. 3 but instead from the internal memory 14, which can comprise or can be a database or any other kind of storage.

The values stored in the internal memory 14 as well as in the external storage device connected to the interface 13, can be for example generated by a machine learning algorithm respectively obtained by machine learning in advance.

It can be also possible that the DC power supply 1 comprise a user interface for inputting data as to the voltage offset or the current offset. In FIG. 5 an example for an user interface is shown in more detail. FIG. 5 shows again a DC power supply 1, which comprises similar or same components as the DC power supply 1 of FIG. 1. In addition, the DC power supply 1 of FIG. 5 comprises a user interface 15 for inputting data as to the voltage offset or the current offset. This user interface 15 is connected to the control unit 6 and is for example a touch screen or the like, which allows a user an easy input of data for the voltage offset or the current offset. This data can then be used for adjusting the voltage offset and the current offset by the control unit 6. The data can be for example any kind of value for the voltage offset and the current offset, wherein it allows a completely flexible input of any value without any restriction. In combination with the control unit 6, the adjusting of the voltage offset or the current offset is completely flexible, and thus, a free an flexible load-related balancing between higher efficiency versus lower ripple & noise versus control behavior without any restrictions is applicable.

Further, it is possible that each one of the DC power supplies 1 shown in the FIGS. 1, 2, 3, 4 and 5 is combined with one of the others and thus, it is possible that the temperature sensor 12, the interface 13, the internal memory 14 and the user interface 15 is used in anyone of the other DC power supplies 1.

Further, it is also possible in all of the DC power supplies 1 of the FIGS. 1, 2, 3, 4 and 5 that the control unit 6 is designed to adjust the voltage offset or the current offset during an ongoing operation of the DC power supply 1. Further, the voltage offset or the current offset can be selected to effect the ripple & noise at the output terminals 4.

By the present invention, it is therefore in particular possible that a great variety of different loads can be connected to a DC power supply that still allows load-related balancing between higher efficiency versus lower ripple & noise versus control behavior.

The invention claimed is:

1. A DC power supply comprising:
   at least one feedback-controlled preregulator,
   at least one feedback-controlled postregulator supplied by the feedback-controlled preregulator,
   output terminals for supplying a regulated constant current or regulated constant voltage to a load, and
   a control unit controlling at least one of the feedback-controlled preregulator and the feedback-controlled postregulator, and designed for adjusting a voltage offset or a current offset added to a signal in a feedback loop of at least one of the feedback-controlled preregulator and the feedback-controlled postregulator,
   wherein the voltage offset or the current offset is calculated by the control unit, preferably on the basis of at least one sensed feedback signal.

2. The DC power supply of claim 1, wherein the control unit is a microcontroller, a processor or a FPGA.

3. The DC power supply of claim 1, wherein the feedback-controlled preregulator is at least one of a switching mode regulator and a phase angle controlled regulator.

4. The DC power supply of claim 1, wherein the feedback-controlled postregulator is at least one of a switching mode regulator and a linear regulator.

5. The DC power supply of claim 1, wherein the voltage offset is a voltage offset at an input of an amplifier or comparator of the DC power supply.

6. The DC power supply of claim 1, comprising a user interface for inputting data as to the voltage offset or the current offset.

7. The DC power supply of claim 1, wherein the sensed feedback signal is a temperature signal of a temperature sensor of the DC power supply.

8. The DC power supply of claim 1, wherein the sensed feedback signal represents a characteristic sensed at the output terminals.

9. The DC power supply of claim 8, wherein the sensed feedback signal represents the voltage or the current at the output terminals.

10. The DC power supply of claim 1, wherein the sensed feedback signal is processed by the control unit in order to detect oscillations in a feedback loop of the feedback-controlled preregulator or the feedback-controlled postregulator.

11. The DC power supply of claim 1, wherein the sensed feedback signal is processed by the control unit in order to detect the frequency of the current or the voltage at the output terminals.

12. The DC power supply of claim 1, wherein a value for the voltage offset or the current offset, to be implemented by the control unit, is obtained from an internal memory of the DC power supply, or from an interface of the DC power supply which can be connected to an external storage device.

13. The DC power supply of claim 12, wherein the values stored in the internal memory or the external storage device are obtained by machine learning.

14. The DC power supply of claim 1, wherein the control unit is designed to adjust the voltage offset or the current offset during an ongoing operation of the DC power supply.

15. The DC power supply of claim 1, wherein the voltage offset or the current offset is selected to affect the ripple & noise at the output terminals.

16. A method for operating a DC power supply comprising:
controlling at least one feedback-controlled preregulator of the DC power supply, controlling at least one feedback-controlled postregulator of the DC power supply supplied by the feedback-controlled preregulator,
adjusting a voltage offset or a current offset and adding the adjusted voltage offset or the adjusted current offset to a signal in a feedback loop of at least one of the feedback-controlled preregulator and the feedback-controlled postregulator, wherein the voltage offset or the current offset is calculated by a control unit of the DC power supply, preferably on the basis of at least one sensed feedback signal, and
supplying a regulated constant current or regulated constant voltage to output terminals of the DC power supply for a load connected to the output terminals.

* * * * *